Patented Sept. 25, 1951

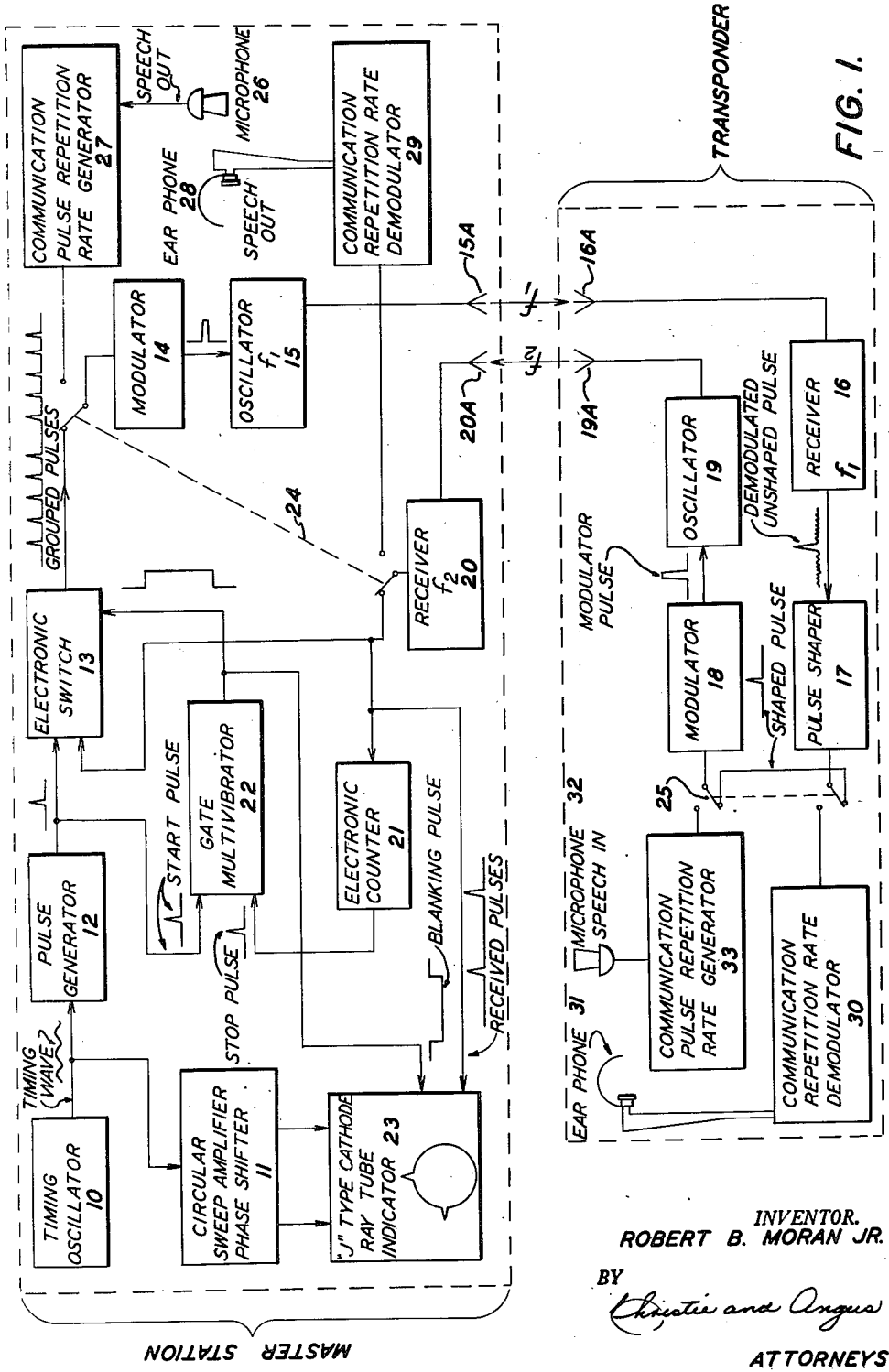

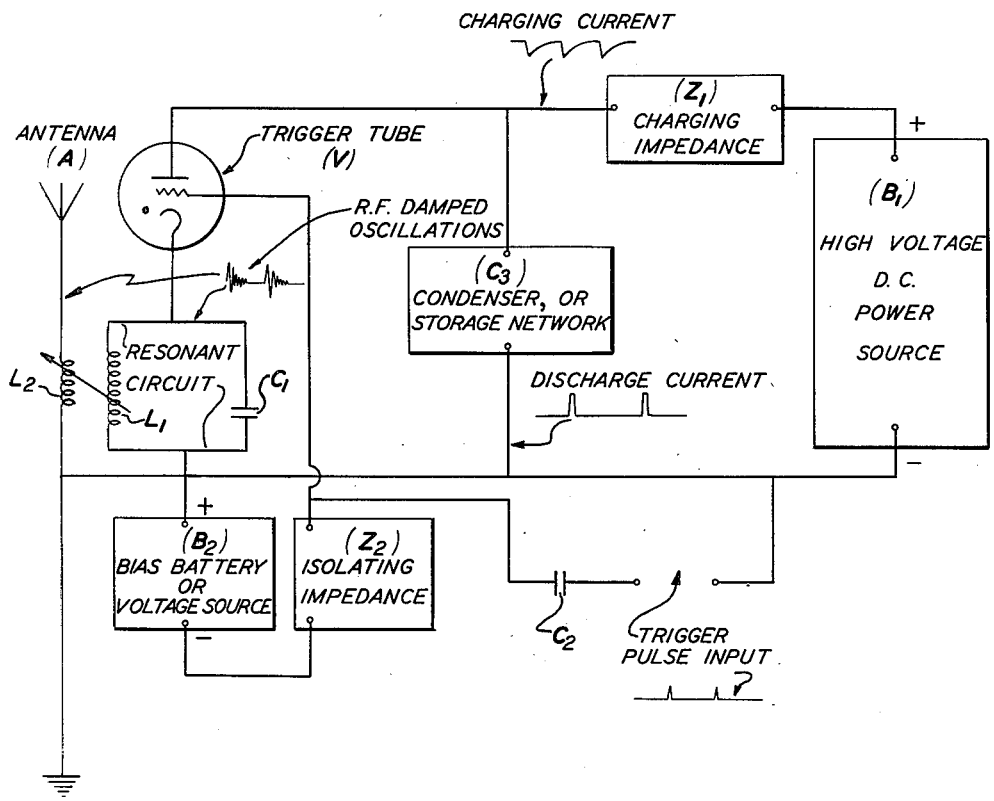

2,568,926

UNITED STATES PATENT OFFICE 2,568,926

DISTANCE MEASUREMENT BY ECHO RANGING

Robert B. Moran, Jr., Pasadena, Calif., assignor to Moran Instrument Corporation, Pasadena, Calif., a corporation of California Application May 26, 1947, Serial No. 750,603

8 Claims. (Cl. 343—6)

This invention is concerned with echo ranging and particularly with the measurement of distance by determining the time required for a signal or pulse (i. e. a short burst of emitted energy in wave form) to be transmitted from its point of origin at one end of a line to be measured to an echoing device or transponder located at the other end of the line and then to be transponded (re-transmitted) back to the point of origin. The invention permits marked improvements in the accuracy of measurements obtainable by echo ranging techniques and (although described hereinafter with reference to R. F. waves) is applicable in a variety of fields, since the signal or pulse which is the basis of the measurement may be a radiated one (for example, a pulse of radio-frequency, a light pulse, or a pulse of infra-red) or it may be an elastic wave (say an acoustic pulse such as a sonic, supersonic or seismic signal).

It has been proposed heretofore to measure the distance between two widely separated points by transmitting a pulse from one of the points to the other, receiving and re-transmitting the pulse at the other point back to the point of origin, receiving the transmitted point at the point of origin and determining the travel time of the pulse for the round trip. The distance between the two points may then be determined, for it is equal to the round trip time minus the delay in re-transmission, if any, this result being multiplied by half the velocity of the particular type of pulse in the particular type of medium.

If the pulses could be made of infinitely short duration so as to effectively mark a point in time, there would be no limit to the accuracy of the method save for possible errors in the figure employed for velocity and in the determination of the delay in transmission and of total elapsed time for the pulse to go out and be returned. Velocities of various types of waves in many media are now accurately known and timing by electronic methods may be performed within close limits, so that these latter factors are not serious limitations. However, a pulse takes time to develop and attenuate and it is frequently difficult to select with accuracy the exact corresponding instant in each pulse. Moreover, the sharpness of a pulse or peak is dependent upon the band width of the particular system in which the pulse occurs. It is expensive to secure broad band widths with corresponding steep peaks, and so, in many instances the production of a steep peak for purposes of increased accuracy is not economically practical. By way of example, echo-ranging systems employing radio waves seldom have an accuracy of better than 50 feet, and this margin of error is maintained irrespective of the distances between stations. This is sufficient accuracy in many cases, but for land surveying and similar purposes a greater accuracy is required.

In accordance with my invention, improved accuracy is obtained by receiving and re-transmitting the pulse at its point of origin, preferably a plurality of times, and measuring the total elapsed time beginning with the origin of the signal and ending with its final reception following echoing and re-echoing. The total elapsed time minus the sum of the delays in the several transmissions and re-transmissions, multiplied by the velocity of the pulse, and divided by the number of times that the pulse is transmitted and re-transmitted is equal to the distance between the points. In other words, my invention contemplates the improvement in echo-ranging which comprises re-echoing a pulse at its point of origin, so that it makes at least three trips between a transmitter and a transponder, and determining the total travel time of the plurality of trips between transmitter and transponder.

As indicated above, the invention is applicable in measurement of distances employing radiated pulses such as those of radio frequency and those having the frequency of light. Moreover, it is applicable in a process employing pulses of an elastic wave such as acoustic pulses, sonic pulses, and seismic pulses. As applied to land surveying, the measurement of height above ground from an airplane, and the like, the use of radio pulses is preferable. For under water measurement, supersonic pulses may be employed, and for measurement between two points in the ground, seismic pulses may be utilized.

The signal is first transmitted from its point of origin to a transponder which re-transmits the signal from the other end of the line after a known delay. A second transponder is located adjacent the transmitter, and may in fact be the same instrument. The second transponder receives and transmits to the first transponder the signal, this process preferably being repeated a number of times. Generally speaking, the greater the number of re-transmissions, the greater the resulting accuracy in the measurement.

If desired, the time at which each signal is returned to the point of origin or received at the transponder may be determined and indicated.

However, it may be desired to prevent the registration of the return pulse except the last time it is returned.

In terms of apparatus, my invention contemplates echo ranging equipment including a signal originating means (i. e. a means which transmits a short burst of energy in wave form), a first means located at a distance from the signal originating means for transponding the signal i. e. receiving and re-transmitting the signal, a signal registration means i. e. an indicator which shows the time of reception of the signal located adjacent either the first transponder or the signal originating means, a second signal transponder means located at the signal originating point, means for causing such transponder to repeat the signal from the first transponding means a predetermined number of times, and means for registering the time required for the signal to make the resulting predetermined number of trips from the signal originating to the signal registration means.

As applied to the field in which radio waves are employed, the device of the invention may comprise a pulse generator for producing intermittent pulses, a transmission oscillator connected to and modulated by the pulse generator, a transponder located at a distance from the transmission oscillator and capable of repeating the signal received from the transmission oscillator, a receiver for the repeated signal located adjacent the transmission oscillator, an indicator connected to the receiver for registering the time of receipt of repeated signals, and means for re-transmitting repeated signals received by the receiver through the transmission apparatus. In this way the transmission oscillator serves a dual purpose, since the signal originates with this apparatus and is also rebroadcast by it.

Apparatus of the foregoing type may be provided with a timing oscillator which is connected to the pulse generator and produces a current of constant frequency which is converted into corresponding pulses by the pulse generator. The timing oscillator is also connected to the indicator for operating it in synchronism with the transmission oscillator and the rest of the apparatus.

If desired, a separate modulator may be connected between pulse generator and transmission oscillator.

It is desirable to provide automatic switching means for disconnecting the pulse generator from the transmission oscillator for a predetermined number of pulse repetitions and connecting the receiver in place of the pulse generator for such repetitions. Such automatic switching means may also be connected to the indicator for making it non-indicating except for the original transmitted pulse and the final predetermined pulse repetition.

These and other features of my invention will be understood more thoroughly in the light of the following detailed description taken in conjunction with the accompanying drawings in which:

Fig. 1 is a schematic block diagram illustrating one form of the apparatus of the invention developed particularly for land surveying at radio frequencies; and Fig. 2 is a wiring diagram of a preferred form of oscillator of my invention, particularly useful as a transmission oscillator in the apparatus of Fig. 1.

The apparatus of Fig. 1 is provided with a master station which includes a timing oscillator 10 (say a crystal oscillator operating at about 100 k. c.). This oscillator runs continuously and provides the basic time standard for the system. Its output is in the form of a sine wave and is employed to drive an amplifier and phase shifting network 11 which generates a circular sweep, and this in turn drives a "J" type cathode ray tube indicator 23, of the type commonly employed in radar systems. A suitable "J" type cathode ray indicator is described in Radio Set SCR–784 Service Manual, TM 11–1554, (this manual is declassified and can be obtained from the Government Printing Office).

The timing oscillator is also employed to drive a pulse generator 12 which produces one trigger pulse for each cycle of the base frequency, the type of pulse being indicated diagrammatically in Fig. 1 on the output side of the pulse generator. The trigger pulses thus generated are fed through an electronic switch 13 to a modulator 14, which modulates an oscillator 15 of radio-frequency. The form of pulse sent from the modulator to the R. F. oscillator is indicated diagrammatically between these pieces of apparatus (the form of waves and their relative duration are shown throughout the apparatus adjacent appropriate connections between blocks.)

The R. F. oscillator radiates a pulse at a predetermined R. F. through its antenna 15A. This pulse is received at an antenna 16A of a receiver 16 which is part of the transponder or echoing device of the system and is tuned to the frequency of the oscillator 15.

The received pulse is demodulated in the receiver and preferably goes to a shaper 17, after which it is employed to re-modulate a second R. F. oscillator 19 through a modulator 18. This second R. F. oscillator preferably is tuned to a frequency distinct from that of the one in the master station so as to eliminate the receiver blocking. However, both oscillators may be tuned to the same frequency. The signal of this second R. F. oscillator is radiated by means of its antenna 19A.

The re-transmitted signal is picked up through an antenna 20A by a receiver 20 (at the master station) which is tuned to the frequency of the second R. F. oscillator 19, i. e. to transponder frequency.

Up to this point, the apparatus of Fig. 1 (save for the electronic switch) is more or less conventional and is comparable to many systems employing "beacon" or "slave" stations as transponders and capable of measuring the time for a single round trip of pulse. The equipment employed for re-echoing purposes is in the master station and includes a gate multivibrator 22. This is preferably of the Eccles-Jordan or flip-flop type, having two stable conditions and requiring a trigger pulse to trip it from one to the other. Thus the multivibrator receives the trigger pulse from the pulse generator 12 and is thereby tripped and set.

The multivibrator is connected to the electronic switch 13 and also to the indicator 23. When it is tripped by the trigger pulse it blanks the indicator, so that this device does not register, and also operates the electronic switch. The switch interrupts the input to the modulator 14 from the pulse generator and connects this input to the receiver 20, so that when the repeated pulse is received at the master station it is re-transmitted through its R. F. oscillator 15, this re-echoing between master station and transponder being repeated as long as the multivibrator remains in its tripped or set condition. In this condition the master station is a transponder.

The output of the receiver in the master station is also fed to the indicator, which responds to each pulse and continues to operate, but does not register the pulses received at this stage of the operation because of its blanked out condition, this being maintained for the duration of the blanking pulse from the multivibrator. In other words, the deflection circuits of the "J" type cathode ray tube indicator are all operative, but the electron (cathode ray) beam is cut off for the duration of the blanking pulse.

The receiver output in the master station is also sent to an electronic counter 21, preferably of the blocking oscillator type. After the pulse has made, say nine round trips, the counter 21 sends out a pulse which re-sets the gate multivibrator. This restoration of the multivibrator immediately unblanks the indicator and resets the electronic switch, so that the next trigger pulse from the pulse generator will bring about a repetition of the entire operation just described. At the same time, since the indicator has been unblanked, the pulse on its tenth round trip will register, and is presented on the indicator with a resulting accuracy in terms of distance measurement approximately ten times that obtainable if the time of a single round trip is measured.

The indicator remains unblanked after recording the tenth round trip of the pulse and so it records the time of the next tripping pulse from the generator. In other words, the electron beam (cathode ray) in the "J" type indicator is not cut off after the tenth round trip of the pulse. Hence the next pulse that is transmitted is registered by the indicator.

If desired, the auxiliary re-echoing system comprising the gate multivibrator, the electronic switch and the scaler counter 21 may be so connected to the rest of the equipment in the master station that they can be cut out at the will of the operator, say by throwing a single switch which not only disconnects the re-echoing system but couples the pulse generator directly to the modulator 14. The re-echoing system thus becomes a "vernier" while the remainder of the system may be employed to obtain the approximate distance between stations in a so-called "coarse" graduation.

By increasing the number of pulses required to trip the electronic counter, the accuracy of measurement may be further increased, at least to some extent. Thus a counter to the scale of 99 will cause the pulse to make 100 round trips, with some increase in accuracy, although the law of diminishing returns applies and in many instances this amount of re-echoing will not bring about a corresponding decrease in the margin of error in measurement.

Voice communication between operators of the master station and the transponding or beacon station may be had with the apparatus of Fig. 1. For voice transmission, the operator of the master station throws a switch 24 which disconnects the modulator and the receiver from the electronic switch and cuts in an auxiliary communication system. This comprises a microphone 26 which feeds a communication pulse repetition rate generator 27. The latter sends out a series of pulses whose repetition rate is controlled by the operator's voice and which is fed into the modulator. In this way, the output of the R. F. oscillator 15 is modulated and radiated to the transponder station.

Throwing the switch 24 to cut the pulse repetition rate generator 27 into the modulator 14 also connects the output of the receiver 20 to a communication repetition rate demodulator 29 provided with earphones 28.

A similar auxiliary communication system is provided at the transponder station, where the throw of a switch 25 connects the pulse shaper 17 to a communication repetition rate demodulator 30 instead of to the modulator 18. Earphones connected to this demodulator permit the operator to hear the voice from the master station. At the same time, the modulator 18 of the transponder station is connected by the switch 25 to a communication repetition rate generator 33 which is modulated in response to speech delivered into a microphone 32 connected thereto.

Two way communication between the stations is thus established with a minimum of equipment. Moreover, the operator at either station may tune his receiver for optimum voice reception, and the same tuning will be optimum for measurement pulse reception. Proper tuning thus becomes almost automatically assured.

The apparatus of Fig. 1 is designed to employ the transmitter in the master station for re-transmission, so that it serves a dual purpose. The same result can be obtained, although much more awkwardly, by employing a plurality of transmitters at the master station, and a like plurality of re-transmitters at the transponder. Thus transmitter A at the master station may send out a pulse of frequency A' to re-transmitter B at the transponder. This re-transmits the pulse at frequency B' to a third re-transmitter C at the master station, which re-transmits at frequency C' to re-transmitter D at the transponder, etc., the final signal being received at frequency N at either the master station or the transponder and the total time measured.

The apparatus of Fig. 1 will operate at a variety of frequencies. For line-of-sight transmission, microwaves or V. H. F. are suitable. But in wooded country and the like, where the line-of-sight may be blocked to the extent that a high frequency pulse is absorbed or reflected in transit, lower frequencies are desirable (so as to employ the ground wave) and I have developed a special type of low frequency oscillator for such application. It is outlined in Fig. 2.

The oscillator system of Fig. 2 comprises a resonant circuit having, for example, an inductance $L_1$ and a capacitance $C_1$ in parallel. The resonant circuit is shock-excited by discharging a condenser or storage network $C_3$ connected in series with the resonant circuit through a trigger tube V such as a thyratron. Thereupon the resonant circuit will oscillate, but this oscillation will be damped rapidly due to the load placed upon it by a radiating system such as an antenna A. This antenna may be inductively coupled to the resonant circuit through a transformer composed of the inductance $L_1$ and a second inductance $L_2$, as shown, or it may be connected directly to the resonant circuit through a capacitance or directly to the inductance $L_1$.

The apparatus has a high voltage power source $B_1$ connected in parallel with the storage network $C_3$ through a charging impedance $Z_1$, the impedance of which is high enough to allow the switching tube V to be extinguished after a single discharge of the storage network $C_3$ and thus cut out the power source B.

A bias battery or voltage source $B_2$ maintains a negative charge on the grid of the gas tube (being connected thereto through an isolating impedance $Z_2$) except when the grid is rendered positive by a trigger pulse.

When a trigger pulse, say one originating in a pulse generator such as that of Fig. 1, is fed into the circuit through a condenser $C_2$, the storage network $C_3$ is discharged through the resonant circuit $C_1L_1$ and thus produces a pulse of radio frequency, frequency being determined by the constants $L_1$, $C_1$.

To summarize the operation of the oscillator of Fig. 2, direct current from the high voltage source $B_1$ is employed to charge the condenser or storage network $C_3$. The energy thus stored is very rapidly discharged through a gas trigger tube V when this is tripped by a positive trigger pulse applied to its grid through the condenser $C_2$. The tube is, in effect, the modulator of the circuit. The charge is thus introduced into the resonant circuit $C_1L_1$ from which it is radiated.

The forms of the waves at various parts of the circuit are indicated on Fig. 2. Thus the R. F. damped oscillations radiated from the resonant circuit take the form of a rapidly decaying wave the envelope of which is exponential. Thus for each trigger pulse the resonant circuit is shock excited and "rings" once, producing the rapidly decaying wave, whose frequency is determined by the constants $L_1C_1$.

In Fig. 2 the antenna is shown as a separate structure coupled inductively to the resonant circuit, but the antenna may itself constitute the resonant circuit.

The oscillator of Fig. 2 is rugged and simple. It is particularly applicable as a transmitting oscillator in an echo ranger for use in wooded territory, for it will produce a short sharp pulse at a low frequency which can be transmitted as a ground wave between the stations.

The apparatus of Fig. 1 may be employed in a number of ways. In open country, where clear lines of sight are obtainable, it may be used in conjunction with a transit or an alidade to determine slant line distance, thus in effect, taking the place of stadia measurements, but with much greater accuracy and range. "Rodmen" each with a portable transponder unit, are sent out and their position at any point within the field of vision may be determined by optically determining azimuth, vertical angle, and electrically determining slant line distance.

In wooded terrain where long lines of sight are unobtainable, lower frequencies are employed so as to overcome the effects of obstacles in the line of sight and a base line is marked by two transponder stations, one at each end. The operator moves the master station from point to point, determining the distances from the two stations each time, and locating each point by triangulation, the three sides of the triangle being known. In such case, elevations are not obtainable by the triangulation, and so the operator should determine them at each point with an accurate altimeter, or the like. For check purposes additional transponders located at known base points may be employed, thus permitting one triangulation to be checked against another for the same location.

I claim:

1. In echo ranging equipment including a signal originator, a signal transponder located at a distance from the signal originator and a signal registration means, the combination which comprises transponding means located at the signal originator, means for causing such transponding means to repeat the returned signal from the transponder located at a distance a pre-determined number of times, and means for registering the time required for the signal to make the resulting number of trips between the signal originator and the signal transponder.

2. In echo ranging equipment including a transmitter of a radiated pulse, a transponder for such pulse located at a distance from the transmitter, and a registration means for the transponded pulse, the combination which comprises a second transponder for radiated pulses located at the transmitter, means for causing the second transponder to repeat the pulse to the first transponder a predetermined number of times, and means for measuring the total time required for the transmitting and transponding of the pulse the predetermined number of times.

3. In echo ranging equipment including a pulse generator for producing intermittent pulses, a transmission oscillator connected to and modulated by the pulse generator and capable of emitting a radiated signal when so modulated, and a transponder located at a distance from the transmission oscillator and capable of repeating the signal received from the transmission oscillator, the combination which comprises a receiver for the repeated signal located adjacent the transmission oscillator, an indicator connected to the receiver for registering repeated signals, and means for re-transmitting the repeated signal to the transponder and means for measuring the total time required for the transmitting and transponding of the signal a predetermined number of times.

4. Apparatus according to claim 3 provided with a timing oscillator for producing a current of constant frequency connected to the pulse generator and controlling it so that the pulse generator produces a pulse for each oscillation of the timing oscillator, the pulse generator being connected to the indicator, and means for operating the pulse generator in synchronism with the transmission oscillator.

5. Apparatus according to claim 3 provided with automatic switching means connected between the pulse generator and the transmission oscillator and also connected to the receiver and arranged for disconnecting the pulse generator from the transmission oscillator for a predetermined number of pulse repetitions and connecting the receiver to the transmission oscillator in place of the pulse generator for such repetitions.

6. Apparatus according to claim 3 provided with automatic switching means connected between the pulse generator and the transmission oscillator and also connected to the receiver and the indicator and arranged for disconnecting the pulse generator from the transmission oscillator for a predetermined number of pulse repetitions and connecting the receiver in place of the pulse generator, said automatic switching means also being arranged to make the indicator non-indicating except for the original transmitted pulse and the final predetermined pulse repetition.

7. In echo ranging equipment, the combination which comprises a transmitter station including means for generating pulses that are equally spaced in time, a pulse modulator connected to this pulse generating means, an oscillator connected to the output of this modulator and a signal receiver; and a beacon station including a second signal receiver, a second modulator, and a second oscillator connected to the output of the second modulator; a communication pulse repetition rate generator, a switch connecting this generator to the input of the first modulator in place of the means for generating the pulses that are equally spaced in time, and a communication pulse repetition rate demodulator connected to the output of the second signal receiver.

8. In echo ranging equipment, the combination which comprises a transmitter station including means for generating pulses that are equally spaced in time, a pulse modulator connected to this pulse generating means, an oscillator connected to the output of the modulator and a signal receiver; and a beacon station including a second signal receiver, a second modulator and a second oscillator connected to the output of the second modulator; and a communicatio pulse repetition rate generator, a switch connecting this generator to the input of the first modulator in place of the means for generating the pulses that are equally spaced in time; a communication pulse repetition rate demodulator connected to the output of the second signal receiver; a second communication pulse repetition rate generator, a switch connecting this second generator to the input of the second modulator in the place of the second signal receiver; and a second communication repetition rate demodulator connected to the output of the first signal receiver.

ROBERT B. MORAN, Jr.

REFERENCES CITED

The following references are of record in the file of this patent:

UNITED STATES PATENTS

| Number | Name | Date |
|---|---|---|
| 1,945,952 | Nicolson | Feb. 6, 1934 |
| 2,075,285 | Hollingsworth | Mar. 30, 1937 |
| 2,134,716 | Gunn | Nov. 1, 1938 |
| 2,333,688 | Shepard | Nov. 9, 1943 |
| 2,357,398 | Gray | Sept. 5, 1944 |
| 2,400,309 | Kock | May 14, 1946 |
| 2,401,807 | Wolff | June 11, 1946 |
| 2,407,199 | Wolff | Sept. 3, 1946 |
| 2,416,895 | Bartelink | Mar. 4, 1947 |
| 2,422,382 | Winchel | June 17, 1947 |
| 2,428,799 | Hayes et al. | Oct. 14 1947 |